United States Patent [19]

Block

[11] Patent Number: 4,707,299

[45] Date of Patent: Nov. 17, 1987

[54] SOLUTION USEFUL IN MAKING CARBON-METAL PHOSPHATE COMPOSITE

[75] Inventor: Michael J. Block, Fullerton, Calif.

[73] Assignee: Union Oil Company of California, Los Angeles, Calif.

[21] Appl. No.: 570,939

[22] Filed: Jan. 16, 1984

Related U.S. Application Data

[62] Division of Ser. No. 470,548, Feb. 28, 1983, Pat. No. 4,454,193.

[51] Int. Cl.$^4$ ............................................. C09K 15/32
[52] U.S. Cl. ................................. 252/400.1; 428/408; 428/367
[58] Field of Search .................... 252/400.2, 506, 507, 252/508, 400 A, 400 R; 428/408, 367, 379, 401, 372, 322.7, 320.2; 427/113, 226, 419.2, 397.7, 244, 294

[56] References Cited

U.S. PATENT DOCUMENTS

| | | | |
|---|---|---|---|
| 3,029,167 | 4/1962 | Carlson et al. | 428/408 |
| 3,342,627 | 9/1967 | Paxton et al. | 428/408 |
| 3,467,683 | 9/1969 | Harson et al. | 252/400.2 |
| 3,666,555 | 5/1972 | Jones | 428/367 |
| 4,292,345 | 9/1981 | Kolesnik et al. | 427/113 |

FOREIGN PATENT DOCUMENTS 805150 12/1958 United Kingdom .

*Primary Examiner*—Deborah L. Kyle
*Assistant Examiner*—T. J. Wallen
*Attorney, Agent, or Firm*—Dean Sandford; Gregory F. Wirzbicki; Robert A. Franks

[57] ABSTRACT

A solution useful in making a carbon-metal phosphate composite comprising a carbon body having a glassy metal metaphosphate distributed therethrough and coating the surface thereof is claimed. The solution comprises a nonionic organophosphorus ester and a metal salt dissolved therein.

13 Claims, No Drawings

SOLUTION USEFUL IN MAKING CARBON-METAL PHOSPHATE COMPOSITE

CROSS-REFERENCE TO RELATED APPLICATIONS

This application is a divisional of U.S. patent application Ser. No. 470,548, filed Feb. 28, 1983, now U.S. Pat. No. 4,454,193 issued on June 12, 1984.

BACKGROUND OF THE INVENTION

1. Field of the Invention

This invention relates to carbon bodies, and to a method for preparing carbon bodies having an improved resistance to oxidation at elevated temperature and a decreased coefficient of friction.

2. Summary of the Art

Carbon oxidizes in air at a measurable rate at approximately 680° F. while graphite reacts at approximately 340° F. The high degree of reactivity of carbon and graphite at elevated temperatures in oxidizing atmospheres is a well-known phenomenon and therefore has limited the use of this otherwise excellent material in many high temperature applications such as in the rocket and missile field. In industrial applications, the use of carbon anodes in aluminum production and graphite electrodes in steel production is well known. However, oxidative attack at operating temperatures of these processes increases the consumption of the carbon bodies by 15 to 30 percent in many cases. It would thus be desirable if the high temperature reactivity could be eliminated or substantially reduced.

It has been known to impregnate carbon bodies with certain metal salts of organophosphates or pyrophosphates and calcine such impregnated articles to provide a composite of carbon and a metal phosphate having increased resistance to oxidation at elevated temperatures. For example see U.S. Pat. No. 3,029,167. The impregnants are synthesized by reacting stoichiometric amounts of a salt of the metal and an acid orthophosphate or pyrophosphate. The process disclosed provides carbon composites having improved resistance to oxidation, but the impregnants utilized are difficult to synthesize consistently in that the acid orthophosphate or pyrophosphate reacts incompletely with the metal salt and leaves large amounts of excess metal salt in the impregnant product of the synthesis. Thus the chemical composition of the impregnant varies significantly and the performance of the carbon bodies prepared therewith is often erratic. Moreover these impregnants have high viscosities and therefore must be diluted with alcohol prior to impregnation. The addition of alcohol as a diluent decreases the concentration of the metal organophosphate or pyrophosphate in the pores of the impregnated carbon body, and, therefore, the desired higher loading of the metal phosphate in the carbon cannot be obtained.

In one attempt to overcome the above problem (in the use of an inert diluent), a molten inorganic phosphate salt was utilized to impregnate the carbon article. See, for example, U.S. Pat. No. 3,342,627. While this process eliminates the diluent, the molten phosphate salts are generally high in viscosity and thus are not efficient as impregnants as desired. Moreover very high temperatures must be utilized to melt the phosphate salt. For example, a temperature within the range of from about 400° to 1500° C. is suggested for effective impregnation. The equipment and operation requirements of this process are obviously substantial.

Another method of preparing composites of carbon and metal phosphates is disclosed in U.S. Pat. No. 3,666,555 wherein a slurry comprising a particulate aluminosilicate refractory material in a phosphoric acid binder is utilized to impregnate the carbon. A slurry, by its two-phase nature, is difficult to distribute uniformly throughout a porous body such as carbon. See also U.S. Pat. No. 4,292,345 wherein a multi-step method of preparing an oxidation-resistant carbon composite is disclosed. This method comprises sequentially impregnating carbon with orthophosphoric acid and an organic compound comprising silicon, titanium or aluminum. The multi-impregnated carbon is then reacted to form a phosphate of silicon, titanium or aluminum.

It is clear that it would be desirable to provide a carbon composite having increased oxidation resistance without going through a multi-step impregnation process, or utilizing molten phosphate salts, inert diluents, or slurries.

Therefore it is one object of this invention to provide a low temperature method for impregnating carbon bodies in a single step with diluent-free solutions of metal metaphosphate precursors.

It is another object of this invention to provide carbon composites having a relatively higher concentration of a metal phosphate uniformly distributed throughout.

It is another object of this invention to provide a process for impregnating carbon utilizing a solution rather than a two-phase slurry or a molten salt to provide a carbon composite having a multi-valent metal phosphate uniformly distributed therethrough.

Additional objects, advantages and features of the invention will become apparent to those skilled in the art from the following description.

SUMMARY OF THE INVENTION

Briefly the invention provides a novel carbon composite characterized by a metal metaphosphate uniformly distributed therethrough and continuously coated on the surface thereof. The metal metaphosphate is the reaction product of a nonionic organophosphorus ester and a metal salt. Furthermore, the invention provides a method for making said novel composite by contacting a carbon body, having an external surface and an internal surface provided by an open network of connecting pores, with a novel solution comprising a nonionic organophosphorus ester and a metal salt to coat both the internal and external surface thereof, curing said coated carbon body to react the organophosphorus ester with said metal salt to thereby provide a metal-phosphorus salt, calcining said cured body to decompose said metal-organophosphorus salt to a metal metaphosphate, and recovering a carbon composite having said metal metaphosphate uniformly distributed therethrough and continuously coated on the surface thereof.

DETAILED DESCRIPTION OF THE INVENTION

The invention provides a method for inhibiting the oxidation and decreasing the coefficient of friction of a carbon body which method comprises contacting a porous carbon body with a solution comprising a nonionic organophosphorus ester and a metal salt to impregnate the solution into the pores of the carbon body.

The carbon body preferably has a substantial internal surface provided by a open network of connecting pores and the impregnation is carried out in a manner to ensure that the solution is distributed uniformly throughout said open network. The novel composite of this invention may be prepared from graphite, baked carbons, graphite-baked carbon composites, graphite fibers, graphite fibers-graphite composites, etc.

Prior to contact with the impregnation solution, the carbon body may be subjected to a vacuum for a time sufficient to remove any trapped gases from the internal pore structure and therefore ensure the uniform impregnation of the body with the solution. For example, the porous carbon body may be placed in a vacuum chamber and the chamber evacuated to a pressure of less than 5 millimeters of mercury, and preferably less than one millimeter of mercury. The vacuum is continued until substantially all of the trapped gases are removed from the pores of the carbon body. The trapped gases may include air or water vapor. The object of such vacuum treatment is to provide an external and internal surface which is easily wetted by the solution.

The impregnating solution, which is described in greater detail hereinafter, may then be introduced into the vacuum chamber and contacted with the evacuated carbon body at conditions sufficient to impregnate substantially the entire volume of the solution into the pores of the carbon body. An excess amount of solution is not undesirable except that, if substantial alteration of the dimensions of the carbon body is to be avoided, the excess has to be removed prior to further processing. The carbon body may be impregnated with approximately 5 to 10 weight percent of solution as further discussed below. The solution will comprise substantially 100 percent of active ingredients for forming the metal metaphosphate reaction product; however, a lower concentration of diluent may be added to the impregnating solution if desired.

The impregnation of the evacuated carbon body is preferably carried out at an elevated pressure to force the solution into and uniformly throughout the body. For example, a pressure of at least 25 p.s.i.g., more preferably 125 p.s.i.g., may be used to ensure that the solution is uniformly distributed throughout the carbon body.

The temperature range over which the evacuation and impregnation is conducted will vary, depending on a number of factors. The upper limit on the temperature utilized during the evacuation of the carbon body is the temperature at which the carbon is thermally degraded, and in fact, since elevated temperatures would assist in the evacuation, elevated temperatures are generally preferred. On the other hand, during impregnation the upper limit on the temperature would be the temperature at which components of the solution begin to evaporate. The lower temperature limit during evacuation is the temperature at which the rate of the evacuation of trapped gases becomes economically unsatisfactory. The lower temperature limit for impregnation is usually dictated by the viscosity of the solution and the possible freezing out or crystallization of any of the components thereof. In general, both the evacuation and impregnation are carried out at ambient conditions for convenience, although temperatures within the range of from 15° to 40° C. are commonly employed.

The impregnated body may be treated to remove excess solution therefrom. For example, a surface coating of this solution is desirable, but excess solution at the surface may affect the uniformity of the surface coating and the dimensions of the body. In any event, the excess would be wasted during the subsequent curing step. Therefore, the impregnated carbon body may be scrapped at the surface to remove excess solution and such solution recovered for reuse. Simple wiping is usually sufficient to remove excess solution from the surface.

The impregnated carbon body is then cured by slowly increasing the temperature over a period of time to about 100° to 150° C. The final temperature is dictated by the goal of reacting the metal salt with the organophosphorus compound to produce a metal-organophosphorus salt, thus ensuring uniform distribution of the active components of the solution throughout the carbon body and preventing exudation of solution to the surface. Usually, the temperature is increased at a rate of from about 10° to about 30° C. per hour, and after reaching a temperature of about 125° C., and being held thereat for 2 to 4 hours, curing is complete.

The cured carbon body is then calcined in an inert atmosphere, e.g. nitrogen, helium, etc., for from about 1 to about 4 hours, at a temperature of at least about 600° C., more preferably at from 700° to 950° C., to decompose the metal-organophosphorus salt and thereby provide an essentially uniform inorganic metal metaphosphate coating on the internal and external surface of the carbon body. Temperature limitations of the calcination step are dictated at the upper limit by phase changes in the metaphosphate inducing undesirable hygroscopic properties and at the lower limit by the decomposition of the metal organophosphorus salt.

The calcined carbon body is recovered as a composite of carbon and a metal metaphosphate wherein such composite is characterized by an increased resistance to oxidation at elevated temperatures and a decreased coefficient of friction. The calcined composite has the metal metaphosphate distributed substantially uniformly therethrough and continuously coated on the surface thereof.

Now having described the method for preparing the novel composite of carbon and metal metaphosphate of this invention the impregnating solution and the components used therein will be described in detail.

The impregnating solution comprises a nonionic organophosphorus ester and a metal salt capable of reacting with said nonionic organosphosphorus ester to provide a metal-organophosphorus salt. The impregnating solution may include a diluent such as an alcohol, an amine, an ether, an ester, etc., but preferably the impregnating solution consists essentially of the metal salt dissolved in the nonionic organophosphorus ester. To avoid the problems of an undesirably high viscosity of the impregnating solution and the non-uniform composition of the resulting composite, both of which are problems in the prior art, the organophosphorus ester is free of acid groups or the corresponding salts thereof.

The nonionic organophosphorus ester may be selected from the group consisting of compounds represented by the general formula:

$$(R_1O)(R_2)P(O)_x(R_3)$$

wherein $R_1$ is a radical selected from the group consisting of hydrocarbyl and substituted derivatives thereof; $R_2$ and $R_3$ are radicals independently selected from the group consisting of hydrogen, hydrocarbyl, oxyhydrocarbyl and substituted derivatives of hydrocarbyl and oxyhydrocarbyl radicals; and x is an integer of 0 or 1. Preferably the above hydrocarbyl and oxyhydrocarbyl will comprise from 1 to about 30 carbon atoms. More preferably, the nonionic organophosphorus ester is selected from the group consisting of compounds represented by the general formula:

$$(R_4O)(R_5O)P(O)(OR_6)$$

wherein $R_4$, $R_5$ and $R_6$ are independently selected from the group consisting of hydrocarbyl and substituted hydrocarbyl radicals. Preferably $R_4$, $R_5$ and $R_6$ will comprise from about 1 to about 20 carbon atoms. The above substituted hydrocarbyl and oxyhydrocarbyl radicals may include hetero atoms selected from the group consisting of halogen, oxygen, sulfur, nitrogen and phosphorus atoms. More preferably $R_4$, $R_5$ and $R_6$ are independently selected from the group consisting of $C_1$ to $C_6$ alkyl radicals. Even more preferably $R_4$, $R_5$ and $R_6$ are lower alkyl radicals such as methyl and ethyl radicals. Most preferably, all of the organo radicals on the nonionic organophosphorous ester are methyl radicals.

The choice of the organo radicals on the nonionic organophosphorus ester is made with the view of providing a liquid at the above impregnating conditions capable of solubilizing sufficient of the metal salt described below to provide a substantially stochiometric mixture, i.e., it is desirable that the mole ratio of metal to phosphate be 1:n, wherein n is the oxidation state of the metal. Therefore, one appropriate basis of selection of the nonionic organophosphorus ester will be its ability to solubilize the metal salt of choice.

Finally the nonionic organophosphorus ester is selected to be capable of decomposing during the formation of the metal-organophosphorus salt and the metaphosphate of the metal to provide fragments that are easily removed from the composite. For this reason the lower alkyl esters are especially preferred, as the decomposition products are the lower alkyl radicals which are usually removed in chemical combination with the anion of the metal salt, e.g. as methyl chloride, ethyl chloride, etc., when the metal salt of choice is a chloride.

The metal salt functions to react with the nonionic organophosphorus ester to provide first a metal organophosphorus salt, and then a glassy inorganic metaphosphate wherein said metal salt is combined with the phosphate anion. Any salt which forms a refractory metaphosphate may be utilized in the process of this invention. However, it has been found that certain cations are more efficient in providing an anti-oxidant coating than others. Therefore, preferably the metal salt comprises a multi-valent metal cation. The multi-valent metal cation is preferably selected from the group consisting of members of groups IB, IIA, IIB, IIIB, VIA, and VIII of the Periodic Table of the Elements. More preferably, the multi-valent cation is selected from the group consisting of magnesium, zinc, cadmium, copper, aluminum, and iron.

It has been found that the zinc and magnesium salts provide carbon composites that are especially resistant to oxidation at elevated temperatures. Thus, zinc and magnesium are even more preferred multi-valent cations. The most preferred salts for preparing the carbon composites of this invention are the magnesium salts, as demonstrated by the results given in the Examples hereinafter.

The anions of the above metal salts are selected to provide solubility in the nonionic organophosphorus ester and for ease of removal during calcination. The common anions such as the halides (especially chloride and bromide), nitrates, etc. are suitable anions for the metal salts utilized in the impregnating solutions of this invention.

A most preferred group of salts for preparing the novel carbon composites of this invention comprises $ZnBr_2$, $Zn(NO_3)_2.3H_2O$, $CrCl_3.6H_2O$, $Cd(NO_3)_2.4H_2O$, $Al(NO_3)_2.9H_2O$, $Cu(NO_3)_2.2.5H_2O$, $Mg(NO_3)_2.6H_2O$ and $ZnCl_2$.

The impregnating solutions of this invention preferably comprise a stoichiometric ratio of the cation of the metal salt and the phosphorous of the nonionic organophosphorus ester, or as close to such stoichiometric ratio as possible. The trivalent metal cations therefore require 3 equivalents of phosphorus and the divalent metal cations require 2 equivalents of phosphorus. With the above most preferred metal salts, ratios of from about 50 to 100% of the stoichiometric ratio have been dissolved in the most preferred nonionic organophosphorus ester trimethyl phosphate. However, an excess of the organophosphorus ester is not a liability except that the excess usually does not incorporate in the metaphosphate coating.

The impregnating solution may be made up by dissolving the appropriate metal salt in the nonionic organophosphorus ester at a suitable temperature, e.g. ambient temperature. The solution is preferably made up fresh prior to impregnation to minimize reaction of the metal salt and the nonionic phosphorus ester. However, alternatively, the temperature of the solution may be held below the temperature of reaction to avoid reaction of the metal salt prior to impregnation.

In view of their improved resistance to oxidation and their decreased coefficient of friction, the composites of this invention are especially useful in seals, bearings, rotors, and other moving engine parts that are subjected to an oxidizing atmosphere at a high temperature.

The invention is further illustrated by the following example which is illustrative of a specific mode of practicing the invention and is not intended as limiting the scope of the appended claims.

EXAMPLE

A number of metal salts are dissolved in trimethyl phosphate to provide impregnating solutions wherein the ratio of metal cation to phosphorus is as close to stoichiometric as is possible. The dissolution is effected by agitating the trimethyl phosphate solvent at a temperature of from about 20° to about 40° C. while slowly adding the salt thereto. The results of these solubilizing experiments are summarized in Table 1 below.

TABLE 1

| Salt | Wt. % of Salt in Solution | Stoichiometric Ratio Metal:Phosphorus | % of Stoichiometric Ratio Achieved |
|---|---|---|---|
| $ZnBr_2$ | 44.6 | 1:2 | 100 |
| $Zn(NO_3)_2.3H_2O$ | 46.5 | 1:2 | 100 |
| $CrCl_3.6H_2O$ | 38.9 | 1:3 | 100 |
| $Cd(NO_3)_2.4H_2O$ | 48.2 | 1:3 | 84.3 |
| $Al(NO_3)_2.9H_2O$ | 42.1 | 1:3 | 81.3 |
| $Cu(NO_3)_2.2.5H_2O$ | 32.2 | 1:2 | 57.1 |
| $Mg(NO_3)_2.6H_2O$ | 33.8 | 1:2 | 55.6 |
| $ZnCl_2$ | 32.7 | 1:2 | 100 |

Four individual purified graphite coupons are impregnated with each of the above solutions. Impregnation with a zinc dimethyl pyrophosphate prepared by reacting zinc chloride and dimethyl acid pyrophosphate in accordance with the procedure of Example II of U.S. Pat. No. 3,029,167 are performed as a control. The impregnations are performed in the following manner. A vacuum is pulled on the graphite coupons for 20 min to insure evacuation of the pores. The impregnant is then added and pressurized to 125 p.s.i.g. to force the impregnant into the graphite pores. The coupons are then wiped clean and cured by slowly raising their temperature to 125° C. The coupons are subsequently calcined by rapidly increasing the temperature to 900° C., and holding that temperature for about 2 hours. After curing and calcining, the impregnated graphite coupon usually evidenced a weight increase of about 3.5 weight percent but the weight increase could fall between 2.0 and 6.0 weight percent.

After determination of weight increase, the impregnated graphite coupons were tested for antioxidant efficacy as follows. A thin slice (0.10×0.5×0.75 in) of an inner section of the impregnated graphite coupon was oxidized under a controlled environment within a thermogravimetric apparatus where temperature, weight loss, and time were monitored and recorded on a strip chart recorder. The test specimens were oxidized at 1450° F. under a compressed air atmosphere with a flow rate of about 2500 cc/min through the reaction chamber. Standardized weight loss rates (g/g-hr) were determined from the thermogravimetric apparatus oxidation testing results and these were used as a measure of the impregnant antioxidant efficacy.

Results of the antioxidant testing are summarized in Table 2 below. Several features of these results are notable. First, all of the zinc salts perform well and provide equal or better antioxidant properties than the control. This indicates that the anion in the initial zinc salt has no effect on the final zinc metaphosphate. The only purpose the anion has is to increase or decrease the zinc salt solubility in trimethyl phosphate. Second, the performance of magnesium nitrate unexpectedly provides exceptional antioxidant properties, therefore demonstrating the effectiveness of the most preferred multivalent metal cation, magnesium, for the metaphosphate coating, Third, copper and chromium salts from hygroscopic products after calcining. This is a less than desirable characteristic and hence these salts are not preferred. Fourth, aluminum and cadmium salt do not seem to be as effective in providing an antioxidant coating. Therefore, these salts are also not preferred.

TABLE 2

| Run No | Salt | Rate, g/hr-g | Ave. (S.D.) | Observations |
|---|---|---|---|---|
| 1 | Cd(NO$_3$)$_2$ | 0.0222 | 0.0246 (0.0030) | Linear Wt Loss |
| 2 | | 0.0227 | | |
| 3 | | 0.0287 | | |
| 4 | | 0.0248 | | |
| 5 | Al(NO$_3$)$_3$ | 0.0308 | 0.0313 (0.0025) | Linear Wt Loss |
| 6 | | 0.0339 | | |
| 7 | | 0.0323 | | |
| 8 | | 0.0280 | | |
| 9 | CrCl$_3$ | 0.0975 | 0.0813 (0.0151) | Non-linear Wt Loss |
| 10 | | 0.0672 | | |
| 11 | | 0.0908 | | |
| 12 | | 0.0698 | | |
| 13 | Cu(NO$_3$)$_2$ | 0.0886 | 0.0647 (0.0160) | Non-linear Wt Loss |
| 14 | | 0.0551 | | |
| 15 | | 0.0562 | | |
| 16 | | 0.0587 | | |

TABLE 2-continued

| Run No | Salt | Rate, g/hr-g | Ave. (S.D.) | Observations |
|---|---|---|---|---|
| 17 | Zn(NO$_3$)$_2$ | 0.0078 | 0.0089 (0.0035) | Linear Wt Loss |
| 18 | | 0.0141 | | |
| 19 | | 0.0071 | | |
| 20 | | 0.0064 | | |
| 21 | ZnBr$_2$ | 0.0109 | 0.0067 (0.0035) | Linear Wt Loss |
| 22 | | 0.0037 | | |
| 23 | | 0.0039 | | |
| 24 | | 0.0082 | | |
| 25 | Mg(NO$_3$)$_2$ | 0.0066 | 0.0058 (0.0012) | Linear Wt Loss |
| 26 | | 0.0070 | | |
| 27 | | 0.0046 | | |
| 28 | | 0.0051 | | |
| 29 | ZnCl$_2$ | 0.0082 | 0.0064 (0.0017) | Linear Wt Loss |
| 30 | | 0.0041 | | |
| 31 | | 0.0063 | | |
| 32 | | 0.0069 | | |
| 33 | Control | 0.0098 | 0.0090 (0.0039) | Linear Wt Loss |
| 34 | | 0.0140 | | |
| 35 | | 0.0048 | | |
| 36 | | 0.0072 | | |

It should be noted that a linear weight loss means that the only process that is occurring is oxidation. A non-linear weight loss means that more than one process is occurring, i.e., loss of adsorbed water, carbon dioxide and/or other volatiles. A non-linear weight loss is less desirable because it means that the composite has a tendency to adsorb volatiles.

While particular embodiments of the invention have been described, it will be understood, of course, that the invention is not limited thereto since many obvious modifications can be made, and it is intended to include within this invention any such modification as will fall within the scope of the appended claims.

I claim:

1. An impregnating solution useful for preparing a carbon composite having improved resistance to oxidation and a decreased coefficient of friction which comprises a metal salt selected from the group consisting of halide and nitrate metal salts dissolved in a nonionic organophosphorus ester.

2. The impregnating solution of claim 1 wherein said metal salt comprises a multivalent metal cation.

3. The impregnating solution of claim 2 wherein said metal is selected from the group consisting of members of Groups IB, IIA, IIB, IIIB, VIA, and VIII of the Periodic Table of the Elements.

4. The impregnating solution of claim 3 wherein said metal is selected from the group consisting of magnesium, zinc, cadmium, copper, aluminum and iron.

5. The impregnating solutions of claim 4 wherein said metal is magnesium.

6. The impregnating solution of claim 5 wherein said metal is zinc.

7. The impregnating solution of claim 2 wherein said organophosphorus ester is selected from the group consisting of compounds represented by the general formula:

$$(R_1O)(R_2)P(O)_x(R_3)$$

wherein $R_1$ is a radical selected from the group consisting of hydrocarbyl and substituted derivatives thereof; $R_2$ and $R_3$ are radicals independently selected from the group consisting of hydrogen, hydrocarbyl, oxyhydrocarbyl and substituted derivatives of hydrocarbyl and oxyhydrocarbyl; and x is an integer of 0 or 1, and wherein said sbustituted derivatives include one or more hetero atoms selected from the group consisting of halogen, oxygen, sulfur, nitrogen and phosphorus atoms.

8. The impregnating solution of claim 2 wherein said organophosphorus ester is selected from the group consisting of compounds represented by the general formula:

$$(R_4O)(R_5O)P(O)(OR_6)$$

wherein $R_4$, $R_5$ and $R_6$ are independently selected from the group consisting of hydrocarbyl radicals.

9. The impregnating solution of claim 8 wherein $R_4$, $R_5$ and $R_6$ are independently selected from the group consisting of $C_1$ to $C_6$ alkyl radicals.

10. The impregnating solution of claim 9 wherein $R_4$, $R_5$ and $R_6$ are methyl radicals.

11. An impregnating solution useful for preparing a carbon composite having improved resistance to oxidation and a decreased coefficient of friction which comprises a magnesium salt selected from the group consisting of magnesium halides and magnesium nitrate dissolved in a nonionic organophosphorus ester selected from the group consisting of compounds represented by the general formula:

$$(R_4O)(R_5O)P(O)(OR_6)$$

wherein $R_4$, $R_5$ and $R_6$ are independently selected from the group consisting of hydrocarbyl radicals.

12. The impregnating solution of claim 11 wherein $R_4$, $R_5$ and $R_6$ are independently selected from the group consisting of $C_1$ to $C_6$ alkyl radicals.

13. The impregnating solution of claim 12 wherein $R_4$, $R_5$ and $R_6$ are methyl radicals.

* * * * *